Jan. 28, 1969
R. G. MOORE, JR  3,423,930
FUEL CONTROL APPARATUS INCLUDING PUT-AND-TAKE FUEL BYPASS
VALVE MEANS FOR WITHDRAWING CONTROLLED
PERCENTAGE OF METERED FUEL
Filed June 19, 1967
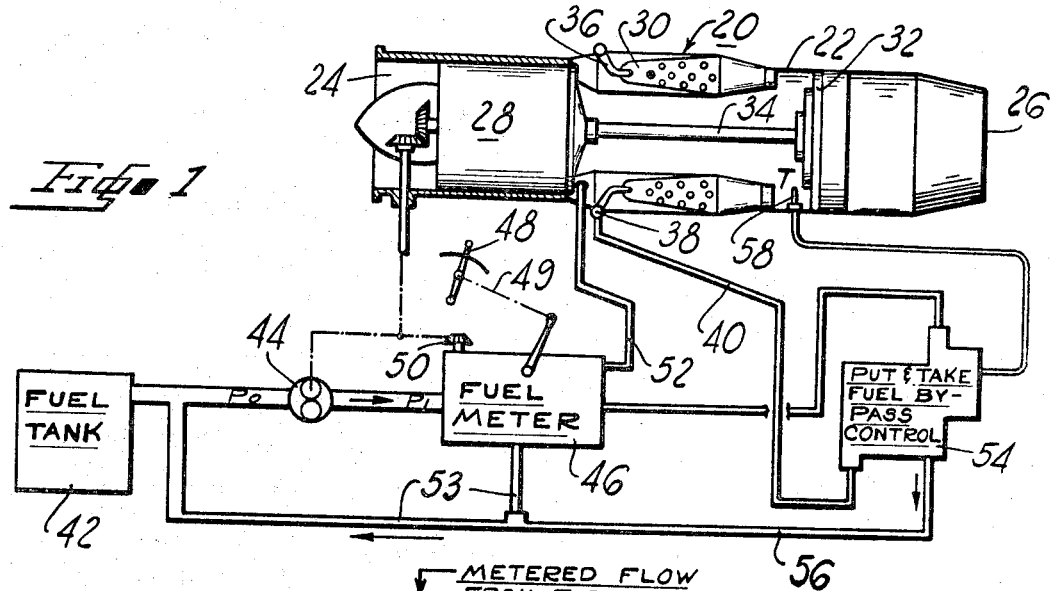
Fig. 1
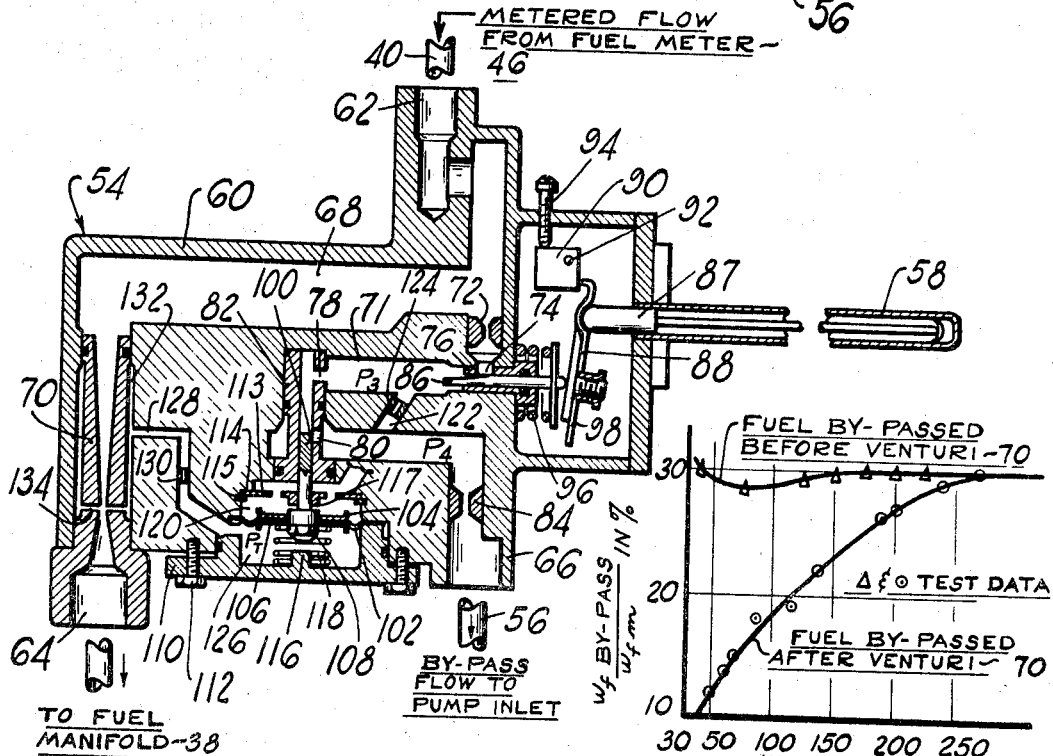
Fig. 2
Fig. 3
INVENTOR.
ROBERT G. MOORE JR.
BY
AGENT

United States Patent Office 3,423,930
Patented Jan. 28, 1969

3,423,930
FUEL CONTROL APPARATUS INCLUDING PUT-AND-TAKE FUEL BYPASS VALVE MEANS FOR WITHDRAWING CONTROLLED PERCENTAGE OF METERED FUEL
Robert G. Moore, Jr., South Bend, Ind., assignor to The Bendix Corporation, a corporation of Delaware
Filed June 19, 1967, Ser. No. 646,862
U.S. Cl. 60—39.28
Int. Cl. F02c 9/10
9 Claims

ABSTRACT OF THE DISCLOSURE

Fuel control apparatus having a fuel conduit connected to supply metered fuel from a main fuel meter to a combustion engine. A fuel bypass valve connected to withdraw a predetermined constant percentage of the metered flow from the conduit upstream from a flow measuring device connected to control the bypass valve in response to the metered flow through the conduit. A valve member in series flow with the bypass valve is responsive to a variable condition of engine operation and adapted to modify the predetermined percentage of metered flow bypassed by the bypass valve as a function of the variable condition of engine operation.

Background of the Invention (1) One type of fuel control for a combustion engine, and in particular, a gas turbine engine is the well-known scheduling type wherein a variable area fuel metering valve is controlled by one or more actuating control networks as a function of selected variable engine operating conditions to establish a corresponding controlled metered fuel flow to the engine during steady state, acceleration and deceleration operation of the engine. Such a scheduling type fuel control may be accurately established to exactly meet a desired engine fuel flow schedule for the abovementioned engine conditions of steady, acceleration or deceleration under any and all variations of the selected engine operating conditions. However, the scheduling type of fuel control is inherently limited with respect to its versatility of automatic adaption to engines having somewhat different optimum fuel demands than those for which a given control may be calibrated to meet, to engines which may utilize different fuels of varying specific gravity and viscosity, and to variations in fuel controls of the same model as a result of manufacturing tolerances and the like. For example, variations in the most desirable schedule of fuel flow for steady state operation for any given engine may occur as a result of changes in combustion efficiency, compressor deterioration, and variations in the type of fuel used, whereas additional variations in said schedule for different engines of the same model may occur as a result of engine-to-engine and/or fuel-control-to-fuel-control variations due to manufacturing tolerances and the like. It is apparent that an accurately calibrated control will not necessarily meet optimum engine fuel requirements throughout the life of a given engine, nor will it or another control of the same model necessarily meet optimum fuel requirements of different engines of the same mode.

To circumvent the difficulties inherent in tailoring a control unit for each individual engine, and to eliminate the necessity of resetting the fuel schedule of any given control as engine hours of use and/or fuel type varies, the hereinafter described put-and-take proportional bypass fuel control is placed in series with and downstream from a main fuel control and operable in response to a turbine temperature responsive device. With this arrangement, the main fuel control is calibrated to schedule fuel flow to the engine at a predetermined percent in excess over that fuel flow required for optimum engine performance under all conditions of engine operation and the fuel bypass fuel control downstream from the main fuel control is adjustable at all times to bypass or withdraw that percentage of total metered fuel flow necessary to maintain an ideal steady state schedule of turbine temperatures and to limit maximum turbine operating temperature during acceleration irrespective of engine and/or fuel control and/or fuel variations.

(2) This invention is an improvement over the apparatus shown and described in U.S. Patent No. 2,979,894, issued Apr. 18, 1961, in the name of H. C. Zeisloft (common assignee), which relates to a fuel bypass valve controlled by a fluid pressure signal derived from a venturi in a fuel supply conduit through which metered fuel passes. The fuel bypass valve is connected to withdraw a predetermined percentage of the metered fuel from the fuel conduit downstream from the venturi. A problem encountered with the above-mentioned prior art device is that the venturi efficiency imposes limitations on the ability of the bypass valve to function accurately and efficiently over a wide range of metered fuel flow rates. The venturi provides good control over the bypass flow over a range of relatively large flow rates, for example, but relatively poor control over bypass flow in a range of lower flow rates due to venturi inefficiency. The use of sophisticated venturi designs to increase venturi efficiency does not provide an adequate solution to the problem particularly if the complexity and/or expense of the bypass system is to be held to a minimum.

It is an object of the present invention to provide a fluid bypass device capable of withdrawing a predetermined constant percentage of metered fluid flow from a metered fluid supply conduit with accuracy over a wide range of metered fluid flow rates.

It is another object of the present invention to provide a simple and accurate fluid bypass device having a fluid flow measuring venturi therein which device is capable of withdrawing from the supply to the venturi a predetermined constant percentage of metered fluid flow to that passing through the venturi over a wide range of metered fluid flow rates with accuracy.

A further object of the present invention is to provide in a fuel control system for a gas turbine engine, a put-and-take type fuel bypass control adapted to withdraw a variable percentage of the total metered fuel flow to the engine for the purpose of maintaining a predetermined schedule of an engine temperature under all conditions of engine operation.

Summary of the invention

The present invention relates to a fuel control system for a combustion engine wherein fuel is metered in excess of engine fuel requirements for optimum engine performance and a fuel bypass device servies to withdraw the necessary percentage of metered fuel to optimize engine performance.

Brief description of the drawings

FIGURE 1 is a schematic representation of a gas turbine engine and fuel system embodying the present invention therefor;

FIGURE 2 is a sectional schematic view of the put-and-take bypass device only of FIGURE 1.

FIGURE 3 illustrates a pair of curves having a metered fuel flow $W_{fm}$ versus percentage of metered fuel withdrawn, $W_f$ bypass/$W_{fm}$.

Description of the preferred embodiment

Referring to Figure 1, numeral 20 designates a conventional gas turbine engine having a casing 22 defining an air inlet 24 and an exhaust opening 26 and enclosing an air compressor 28, combustion chambers 30 and gas turbine 32. The gas turbine 32 is adapted to drive the compressor 28 via shaft 34.

The combustion chambers 30 are supplied metered pressurized fuel via fuel injection nozzles 36 connected to fuel manifold 38 which, in turn, is connected to a fuel supply conduit 40. The fuel supply conduit 40 is connected to a fuel source 42. An engine driven fuel pump 44 in conduit 40 recesses fuel at pump inlet pressure $P_0$ and discharges fuel at pump outlet pressure $P_1$. A fuel meter 46 of conventional design downstream from pump 44 is adapted to regulate the flow of fuel through conduit 40 and may take any one of various forms including such fuel controls as shown and described in Patent No. 3,152,444, issued Oct. 13, 1964, to J. L. Peczkowski et al., Patent No. 3,040,529, issued June 26, 1962, to J. E. Hurtle or Patent No. 2,720,751, issued Oct. 18, 1955, to W. J. Kunz, Jr., all of which patents and the present application have a common assignee. These prior art fuel metering controls include a variable area fuel metering valve, not shown, controlled as a function of various parameters of operation which may include the position of the throttle lever 48 connected to fuel meter 46 via linkage means 49, compressor rotation speed transmitted to the fuel meter 46 via conventional gear and shafting generally indicated by 50, and compressor discharge pressure transmitted to the fuel meter 46 via a conduit 52. The fuel meter 46 may also contain a conventional fuel bypass valve, not shown, arranged to regulate the fuel pressure differential across the variable area fuel metering valve by permitting more or less to be bypassed through a bypass conduit 53 leading from fuel meter 46 to conduit 40 upstream from fuel pump 44.

Put-and-take fuel bypass control 54 in conduit 40 downstream from fuel meter 46 is adapted to receive and sense the metered fuel flow from fuel meter 46 and withdraw a predetermined percentage of the same. The fuel withdrawn is returned to conduit 40 upstream from pump 44 via bypass conduit 56 connecting bypass control 54 with conduit 53. The bypass control 54 is supplied a turbine inlet gas temperature signal via a temperature responsive element 58 suitably connected to the engine 20.

Referring to FIGURE 2, the put-and-take fuel bypass control 54 comprises a casing 60 having metered fuel inlet 62 and outlet 64 connected to conduit 40 and a bypass outlet 66 connected to conduit 56. The inlet 62 and outlet 64 are connected by a conduit 68 containing a venturi 70. Fuel is withdrawn from passage 68 upstream from venturi 70 and passes to bypass outlet 66 via a conduit 71 which includes a flow restriction 72, a variable area orifice 74 formed in a tubular member 76 fixedly secured in casing 60 as by a press fit, an inlet orifice 78 and a variable area outlet orifice 80 formed in a tubular member 82 fixedly secured in casing 60 as by a press fit, and a flow restriction 84.

A tapered valve 86 slidably carried in tubular member 76 is adapted to cooperate with orifice 74 to vary the effective flow area of the latter. The valve 86 is positioned as a function of the inlet temperature T at turbine 32 by temperature responsive element 58 which may be a conventional probe adapted to expand and contract in response to an increase and decrease, respectively, of temperature T. The temperature responsive element 58 is suitably connected to casing 60 through which the movable output end 87 extends into engagement with a lever 88 fulcrumed at one end on an adjustable support 90. The support 90 is pivotally secured to casing 60 by a pin 92 and positioned by a screw member 94 threadedly engaged with casing 60 and bearing against support 90. The opposite movable end of lever 88 bears against the end of valve 86 which is spring loaded into engagement therewith by a compression spring 96 interposed between casing 60 and a spring retainer 98 secured to valve 86.

The flow area of variable area outlet orifice 80 in tubular member 82 is controlled by a valve 100 slidably carried in tubular member 82 and actuated by a diaphragm 102 suitably secured to one end thereof by backing plates 104 and 106 and a nut 108 threadedly engaged with the end of valve 100. The radially outermost portion of diaphragm 102 is clamped between casing 60 and the annular end of a cap 110. The cap 110 is secured to casing 60 by suitable fastening means such as a plurality of bolts 112.

The valve 100 is slidably covered by a guide member 113 suitably received against a shoulder 114 of casing 60 and secured in position thereagainst by any suitable fastening means such as snap ring 115.

Stop members 116 and 117 protruding from cap 110 and guide member 113, respectively, are adapted to limit the range of movement of diaphragm 102. A compression spring 118 interposed between plate 106 and cap 110 serves to bias valve 100 toward a closed position. One side of diaphragm 102 is exposed to fuel pressure $P_3$ in a chamber 120 which is vented to conduit 71 downstream from valve 86 via a passage 122 containing a restriction 124. The opposite side of diaphragm 102 is exposed to venturi 70 throat pressure $P_t$ in a chamber 126 which is vented to the throat of venturi 70 via a passage 128 containing a restriction 130, annulus 132 and venturi passages 134.

It will be assumed that the engine 20 is operating at a stable speed in accordance with the set position of throttle lever 48 and a given compressor discharge air pressure. Under such conditions, the quantity of fuel discharged by fuel meter 46 is regulated to a corresponding constant value as long as no change occurs in any of the abovementioned variables. The metered flow of fuel from fuel meter 46 passes to the put-and-take bypass control inlet 62 then through conduit 68 and venturi 70 to outlet 64. A predetermined percentage of metered fuel flow is withdrawn from conduit 68 via conduit 71 wherein the effective flow area of orifice 74 is established by valve 86 which occupies a normal or null position in accordance with a predetermined turbine 32 inlet temperature to be maintained. The fuel pressure $P_3$ downstream from valve 86 and thus the fuel pressure differential $P_2-P_3$ across valve 86 is controlled by the valve 100 which responds to the fuel pressures $P_3$ and $P_t$ across diaphragm 102. It will be recognized that the square root of the static pressure recovery through the venturi 70 is proportional to the flow of fuel therethrough. The spring 118 urging valve 100 toward a closed position is a relatively light spring and adapted to impose a very light force on valve 100 to hold the same closed when metered fuel flow from fuel meter 46 is relatively low as, for example, under engine starting conditions. The venturi throat pressure $P_t$ in chamber 126 acts against diaphragm 102 to urge valve 100 to a position whereby the fuel pressure $P_3$ in conduit 71 which acts against the opposite side of diaphragm 102 is controlled to substantially the same pressure as venturi throat pressure $P_t$ whereupon diaphragm 102 is stabilized. The effect of spring 118 may be considered negligible at metered flow rates in excess of the starting flow rate so that diaphragm 102 and thus valve 100 becomes stabilized in response to substantially equal fuel pressures $P_3$ and $P_t$. The $P_2-P_3$ pressure differential thus established across the orifice 74 by the valve 100 results in a predetermined fixed percentage of fuel withdrawn through conduit 71 to outlet 66.

In the event of variations in, $W_{fm}$, the flow of fuel metered by fuel meter 46 caused by changes in the setting of throttle lever 48, compressor speed variations and/or compressor discharge pressure, the quantity of fuel withdrawn through conduit 71 will remain at the predetermined constant value by virtue of the resetting of valve 100 in response to changes in venturi throat pressure $P_t$ to thereby adjust pressure $P_3$ and thus the pressure differential $P_2-P_3$ across orifice 74 accordingly. The percentage of fuel withdrawn through conduit 71 will vary only as a function of the area of orifice 74. If, for any reason, the turbine 32 inlet temperature should increase above the heretofore mentioned predetermined value, the valve 86 will move in response to the probe 58 causing an increase in flow area of orifice 74 which, in turn, results in a corresponding greater percentage of metered fuel withdrawn from conduit 68 or simply, "take" action of control 54. The increase in flow area of orifice 74 results in an increase in fuel pressure $P_3$ acting against diaphragm 102 which overcomes opposing pressure $P_t$ causing valve 100 to move in an opening direction to thereby reduce pressure $P_3$ as necessary to equal pressure $P_t$ whereupon valve 100 is stabilized. The resulting increased percentage of metered fuel withdrawn from conduit 68 reduces the quantity of fuel passing through conduit 68 to the combustion chambers 30 to effect a reduction in turbine 32 inlet temperature until the valve 86 returns to its normal or null position. The reverse of the above holds true in case of a decrease in turbine 32 inlet temperature. The valve 86 responds to a decrease in temperature from the abovementioned predetermined value causing a decrease in flow area of orifice 74 which, in turn, results in a corresponding lesser percentage of metered fuel withdrawn or, simply, "put" action of control 54. The decrease in flow area of orifice 74 results in a decrease in pressure $P_3$ against diaphragm 102 whereupon the opposing pressure $P_t$ urges valve 100 toward a closed position to thereby increase pressure $P_3$ as necessary to equal pressure $P_t$ whereupon valve 100 is stabilized.

The percentage of fuel withdrawal through orifice 74 is dependent upon the effective flow area of orifice 74 and thus the position of valve 86 which may be contoured as shown to provide a linear relationship between the area of orifice 74 and turbine 32 inlet temperature. A nonlinear relationship may be established by suitable variations in contour of valve 86.

FIGURE 3 illustrates a plot of metered fuel flow $W_{fm}$ versus the percentage of metered fuel withdrawn through conduit 71 $W_t$ bypass/$W_{fm}$ for a range of metered fuel flow from approximately 40 to 250 lbs./hr. which represents the lower portion of the total fuel flow schedule which the fuel meter 46 is designed to deliver to the engine 20. Each of the two curves is defined by an associated set of test data points obtained by flow bench test. The one curve labeled "fuel bypass before venturi 70" corresponds to the flow data obtained from the above described put-and-take fuel bypass control 54 wherein the bypass conduit 71 withdraws metered fuel from conduit 68 upstream from venturi 70. The second curve labeled "fuel bypassed after venturi 70" corresponds to flow data obtained by withdrawing metered fuel from conduit 68 downstream from venturi 70 as is the case in the put-and-take bypass control of the heretofore mentioned Patent No. 2,979,894.

It has been found that with the bypass conduit connected to withdraw metered fuel from conduit 68 downstream from venturi 70, the percentage of metered fuel withdrawn for a given position of valve 86 falls off rapidly as metered fuel flow falls below a certain relatively low rate of metered fuel flow by virtue of the well-known inherent inefficiency of the venturi 70. In the higher rates of metered fuel, the venturi 70 efficiency is satisfactory and the percentage of metered fuel withdrawn from conduit 68 may be held substantially constant as, for example, the thirty percent line along which both units coincide if extended beyond the indicated test data points.

The abovementioned adverse effect of venturi efficiency may be eliminated by withdrawing metered fuel flow from conduit 68 upstream from venturi 70 as shown in FIGURE 2. The curve labeled "fuel bypassed before venturi 70" illustrates the drastic improvement in maintaining a substantially constant percentage of withdrawn metered fuel for a given position of valve 86 as metered fuel flow decreases below the relatively low rate of 250 lbs./hr. The slight depression in the curve between 40 and 150 lbs./hr. is attributed to diaphragm 102 flexing and attendant area variation as the venturi throat pressure $P_t$ decreases in accordance with the relatively low metered fuel flow rates and may be compensated for by suitable spring loading, not shown, of the diaphragm 102 as will be recognized by those persons skilled in the art.

The position of valve 86 relative to orifice 74 for a given turbine 32 inlet temperature may be set for calibration purposes by suitable adjustment of the screw member 94.

It will be understood that the valve 86 may be actuated as a function of variable conditions of engine operation other than turbine inlet temperature if desired. The input to valve 86 may be a position signal generated as a function of an engine temperature to be controlled by varying metered fuel flow to the combustion chambers or a force signal derived from an engine generated fluid pressure dependent upon the quantity of fuel delivered to the combustion chambers or any similar input signal as will be recognized by those persons skilled in the art.

It will be understood that various changes and modifications in the above described apparatus may be made by those persons skilled in the art without departing from the scope of applicant's invention as defined by the following claims. Also, it will be recognized that the above described put-and-take bypass apparatus is not limited to use in a fuel control system since it may be equally useful in controlling fluid in various fluid systems wherein a predetermined percentage of a regulated fluid flow is to be withdrawn.

I claim:
1. Fluid flow control apparatus comprising:
   a main fluid conduit connected to deliver fluid from a pressurized source of fluid to a fluid receiver;
   a restriction in said fluid conduit adapted to generate an output fluid pressure representative of the rate of fluid flow through said restriction;
   a branch conduit connected to said main fluid conduit upstream from said restriction for withdrawing a portion of the fluid therefrom;
   first valve means in said branch conduit for establishing an effective flow area thereof; and,
   means responsive to said output fluid pressure for regulating the fluid pressure in said branch conduit downstream from said first valve means to be substantially equal to said output fluid pressure to regulate fluid flow through the branch conduit to maintain a substantially constant percentage relationship between the fluid flow through said branch conduit relative to the fluid flow through said restriction.

2. Fluid flow control apparatus as claimed in claim 1 wherein:
   said restriction in said fluid conduit is a venturi; and,
   said output fluid pressure is venturi throat pressure.

3. Fluid flow control apparatus as claimed in claim 1 wherein said means responsive to said output fluid pressure includes:
   second valve means in series flow relationship with said first valve means;
   fluid pressure responsive means operatively connected to said second valve means and responsive to said output fluid pressure and the fluid pressure downstream from said first valve means;
   said first and second valve means being operative to control the fluid flow through said branch conduit to thereby withdraw therethrough a substantially constant percentage of the fluid flow supplied by said pressurized source to said main fluid conduit regardless of variations in said supplied fluid flow.

4. Fluid flow control apparatus as claimed in claim 3 and further including:
   control means operatively connected to said second valve means for actuating the same to vary the effective flow area of said branch conduit and change the percentage of fluid withdrawn through said branch conduit accordingly.

5. Fuel control apparatus for a gas turbine engine comprising:
 a source of pressurized fuel having an inlet and an outlet;
 a metered fuel conduit connected to deliver fuel from said source outlet to the engine;
 a fuel meter in said metered fuel conduit for regulating the flow of fuel therethrough as a function of selected variable conditions of engine operation;
 flow measuring means operatively connected to said metered fuel conduit and adapted to generate an output signal representing the rate of fuel flow therethrough;
 a fuel bypass conduit connected to said metered fuel conduit upstream from said flow measuring means and to said source inlet for returning a predetermined portion of said metered fuel flow to said source;
 valve means in said bypass conduit for controlling the effective flow area thereof; and,
 means responsive to said output signal for controlling the fuel pressure downstream from said valve means and thus the fuel pressure drop across said valve means to maintain said predetermined portion of fuel withdrawn at a substantially constant percentage of the metered fuel flow through said metered fuel conduit regardless of variations in metered fuel flow.

6. Fuel control apparatus for a gas turbine engine as claimed in claim 5 and further including:
 means responsive to a variable condition of engine operation operatively connected to said valve means for actuating the same;
 said valve means being operative to withdraw various predetermined percentages of fuel from said metered fuel conduit depending upon the position of said valve means.

7. Fuel control apparatus for a gas turbine engine as claimed in claim 5 wherein:
 said flow measuring means includes a venturi and said output signal is venturi throat pressure;
 said means responsive to said output signal includes second valve means in series flow relationship with and downstream from said first named valve means;
 fuel pressure responsive means operatively connected to said second valve means and responsive to said venturi throat pressure and the fuel pressure downstream from said first named valve means;
 said second valve means being operative in response to said fuel pressure responsive means to control the fuel pressure downstream from said first named valve means to substantially the same pressure as said venturi throat pressure.

8. Fuel control apparatus for a gas turbine engine as claimed in claim 7 wherein:
 said fuel pressure responsive means is preloaded by a relatively light spring to hold said second valve means closed under relatively low metered fuel flow conditions which exist during engine starting.

9. Fuel control apparatus for a gas turbine engine as claimed in claim 6 wherein:
 said variable condition of engine operation is gas turbine inlet temperature.

References Cited
UNITED STATES PATENTS

| | | | |
|---|---|---|---|
| 2,405,888 | 8/1946 | Holley | 60—39.28 |
| 2,979,894 | 4/1961 | Zeisloft | 60—39.28 |
| 2,982,096 | 5/1961 | Bevers et al. | 60—39.28 |

JULIUS E. WEST, *Primary Examiner.*